(12) United States Patent
Komatsu et al.

(10) Patent No.: US 9,118,173 B2
(45) Date of Patent: Aug. 25, 2015

(54) DIGITAL PROTECTION CONTROL SYSTEM AND DIGITAL PROTECTION CONTROL APPARATUS

(75) Inventors: Chikashi Komatsu, Hitachi (JP); Mitsuyasu Kido, Hitachinaka (JP); Shoji Yoshida, Hitachi (JP); Kazuhisa Takami, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 13/576,843

(22) PCT Filed: Feb. 3, 2010

(86) PCT No.: PCT/JP2010/000621
§ 371 (c)(1),
(2), (4) Date: Aug. 2, 2012

(87) PCT Pub. No.: WO2011/096011
PCT Pub. Date: Aug. 11, 2011

(65) Prior Publication Data
US 2014/0146430 A1    May 29, 2014

(51) Int. Cl.
*H02H 3/00* (2006.01)
*H02H 7/00* (2006.01)
(Continued)

(52) U.S. Cl.
CPC .......... *H02H 1/0061* (2013.01); *H02H 1/0084* (2013.01); *H02H 7/261* (2013.01)

(58) Field of Classification Search
USPC ........................................ 361/62–68, 80, 81
See application file for complete search history.

(56) References Cited

U.S. PATENT DOCUMENTS 4,322,768 A * 3/1982 Maeda et al. ................... 361/64
4,612,594 A * 9/1986 Yamaura et al. ............... 361/68
(Continued)

FOREIGN PATENT DOCUMENTS

JP   64-5322 A    1/1989
JP   10-23654 A   1/1998
(Continued)

OTHER PUBLICATIONS

Yoshifumi Ooura, "Protective Relay System Engineering", Institute of Electrical Engineers, pp. 158-159, 164-165 (English translation attached).
(Continued)

*Primary Examiner* — Thienvu Tran
*Assistant Examiner* — Christopher Clark
(74) *Attorney, Agent, or Firm* — Crowell & Moring LLP

(57) ABSTRACT

Disclosed are a digital protection control system and a digital protection control apparatus, wherein the digital protection control apparatus can easily be made to have more terminals, even when the number of terminals of a power transmission line increases. The digital protection control system has, as terminal stations thereof, a reference station that is to become the reference point for the sampling time at which power grid current information is to be taken in, tail-end stations that take in power grid current information from the power grid system, and intermediate stations that are connected between the reference station and the tail-end stations via transmission paths. The intermediate station is provided with an uplink transmission unit that is connected to a transmission path at the reference station side thereof, and a plurality of downlink transmission units that are connected to transmission paths at the tail-end station side thereof. The intermediate station also has the time thereof to be subordinate to the time of the terminal station connected to the uplink transmission unit thereof, and the time of the terminal stations connected to the downlink transmission units thereof are made to be subordinate to the intermediate station, with the time thereof used as reference time.

12 Claims, 12 Drawing Sheets

(51) Int. Cl.
*H02H 7/26* (2006.01)
*H02H 1/00* (2006.01)

(56) References Cited

U.S. PATENT DOCUMENTS

| | | | | |
|---|---|---|---|---|
| 5,574,611 | A * | 11/1996 | Nishijima et al. | 361/64 |
| 5,576,625 | A * | 11/1996 | Sukegawa et al. | 324/424 |
| 5,627,716 | A * | 5/1997 | Lagree et al. | 361/93.2 |
| 5,786,699 | A * | 7/1998 | Sukegawa et al. | 324/617 |
| 6,678,134 | B2 * | 1/2004 | Sugiura et al. | 361/68 |
| 6,892,115 | B2 * | 5/2005 | Berkcan et al. | 700/286 |
| 7,236,338 | B2 * | 6/2007 | Hale et al. | 361/42 |
| 2004/0080885 | A1 * | 4/2004 | Gaksch et al. | 361/62 |
| 2005/0057869 | A1 * | 3/2005 | Hale et al. | 361/64 |
| 2010/0002348 | A1 * | 1/2010 | Donolo et al. | 361/64 |

FOREIGN PATENT DOCUMENTS

| | | |
|---|---|---|
| JP | 2005-269759 A | 9/2005 |
| JP | 2009-207335 A | 9/2009 |

OTHER PUBLICATIONS

International Search Report including English language translation dated May 11, 2010 (Two (2) pages).

"ATM Transmissions of Microprocessor-Based Current Differential Teleprotection Signals", Serizawa, et al., IEEE Transactions on Power Delivery, IEEE Service Center, New York, NY, US, vol. 14, No. 2, Apr. 1, 1999, pp. 335-341, XP011049728, (Eight (8) pages).

European Search Report dated Oct. 14, 2014 (Nine (9) pages).

* cited by examiner

DIGITAL PROTECTION CONTROL SYSTEM AND DIGITAL PROTECTION CONTROL APPARATUS

TECHNICAL FIELD

The present invention relates to a digital protection control system and digital protection control apparatus which detect a failure and abnormality occurring in a power system.

BACKGROUND ART

Against a failure occurring in a power system so-called short circuit failure or earth faulting, a protection relay device installed in each element such as a transmission line, transformer, bus, and generator forming a power system operates with respect to a failure occurring within its territory. When a section containing the failure point is separated from the left trouble-free power system through tripping of a breaker, a failure is removed. At present, there goes mainstream a digital protection relay in which current information or voltage information of power system is digitized and algorithm for determining a system failure is realized through software process.

As its function, hopefully, a power protection relay correctly detects a failure within a previously allocated protection object and fast separates from a power system a section which a failure occurrence section can be minimized. Accordingly, ideally, a device referred to as a main protection device which ought to operate at first at the time when a failure occurs fast operates if at all possible in an internal failure and fails to operate in an external failure. Accordingly, as a method for accurately detecting a failure, a current differential principle is widely used for a relay for the main protection device.

However, as in a transmission line protection device, current information of both ends of transmission lines is necessary for using a current differential principle. In this case, a relay is installed in both ends of the transmission line and both the ends are connected by a communication line. At least at one end, the current information units of both the ends are collected, thereby using the current differential principle. Through congestion of transmission lines, multiple-terminal transmission lines are currently used and transmission lines having five or six terminals are more used.

As can be seen from the above sequence, current information in which sampling synchronization of all terminals is accomplished and communication paths for collecting the current information are necessary for applying a protection relay of the current differential principle to a multiple-terminal transmission line. As a method for configuring a communication path in the case where a multiple-terminal transmission line is used, there are used a representative terminal judgment type in which from a representative terminal, the left terminals are connected through communication lines in a radial pattern and data of all terminals is collected to the representative terminal, and a loop system in which a relay is installed in each terminal, a terminal is connected to each other in a loop form through a communication line, and data of all terminals is collected (see, for example, NON PATENT LITERATURE 1).

For realizing a protection of a high-accuracy transmission line, high-precision sampling synchronization is needed. A sampling synchronization method in which a delay in a transmission path is considered is each applied to a configuration of the communication path (see, for example, NON PATENT LITERATURE 1).

CITATION LIST

Non Patent Literature

NON PATENT LITERATURE 1: "Protective relay system engineering" edited by Yoshifumi Ooura, Institute of Electrical Engineers, pp. 158-159, 164-165

SUMMARY OF INVENTION

Technical Problem

Recently, a transmission line tends to be increasingly provided with multiple terminals due to the facts that acquisition of site for a transforming station is difficult and a power supply is dispersed. Terminals are expanded with respect to existing transmission lines in many cases. Along with the above, a transmission line protection device also needs to respond to expansion of terminals. Also, a communication path, as a matter of course, needs to be changed.

In the aforementioned representative terminal judgment type of conventional technology, a communication path is relatively simple. However, a representative terminal needs to have communication ports as much as the number of terminals to be used, and physical communication ports need to be increased according to the increase in the number of terminals. Along with the above, relay calculation processes also need to be increased based on the receiving process of communication or the received data, and the above is a restriction during the increase in the number of the terminals.

On the other hand, in a system using communication paths of conventional loop system, the number of communication ports of each terminal fails to increase. However, for collecting data of all terminals, data is sequentially transferred in a loop form between terminals. That is, data needs to be relayed and the number of times of transferring data increases according to the increase in the number of the terminals. This is an important factor in obstructing a high speed operation as a relay device, and also is a restriction during the increase in the number of the terminals.

As described above, when multiple-terminal transmission lines are conventionally used, there is also a restriction on the side of the current differential relay device which protects transmission lines, and it is a factor in obstructing a multiple-terminal operation.

In view of the foregoing, it is an object of the present invention to provide a digital protection control system and digital protection control apparatus capable of easily implementing a multiple-terminal current differential relay system.

Solution to Problem

To accomplish the above objects, according to one aspect of the present invention, there is provided a digital protection control system. This digital protection control system includes as a terminal station: a reference station configured to take system current information and function as a reference of sampling time; a tail-end station configured to take system current information from a power system; and an intermediate station configured to be connected through a transmission path between the reference station and the tail-end station, wherein: the digital protection control system transmits and receives system current information between a plurality of the terminal stations and performs protection control of the power system; the intermediate station includes an upper transmission unit connected to a transmission path of the reference station side and a plurality of lower transmission units connected to a transmission path of the tail-end station side; and subordinates time of the intermediate station to time as a reference of a terminal station connected to the upper transmission unit, and subordinates time of a terminal station connected to the lower transmission unit to time as a reference of the intermediate station.

Advantageous Effects of Invention

Through a configuration according to the present invention, a protection control system for a multiple-terminal transmission line capable of easily expanding terminals can be constructed while securing a sampling synchronization from a power system. Accordingly, for example, a terminal can be easily added due to dispersion of power supply, or a terminal of the transmission line can be easily added due to generation of a new load.

DESCRIPTION OF EMBODIMENTS

Preferred embodiments of the present invention will now be described in detail below with reference to the accompanying drawings.

First Embodiment

Figure 1:
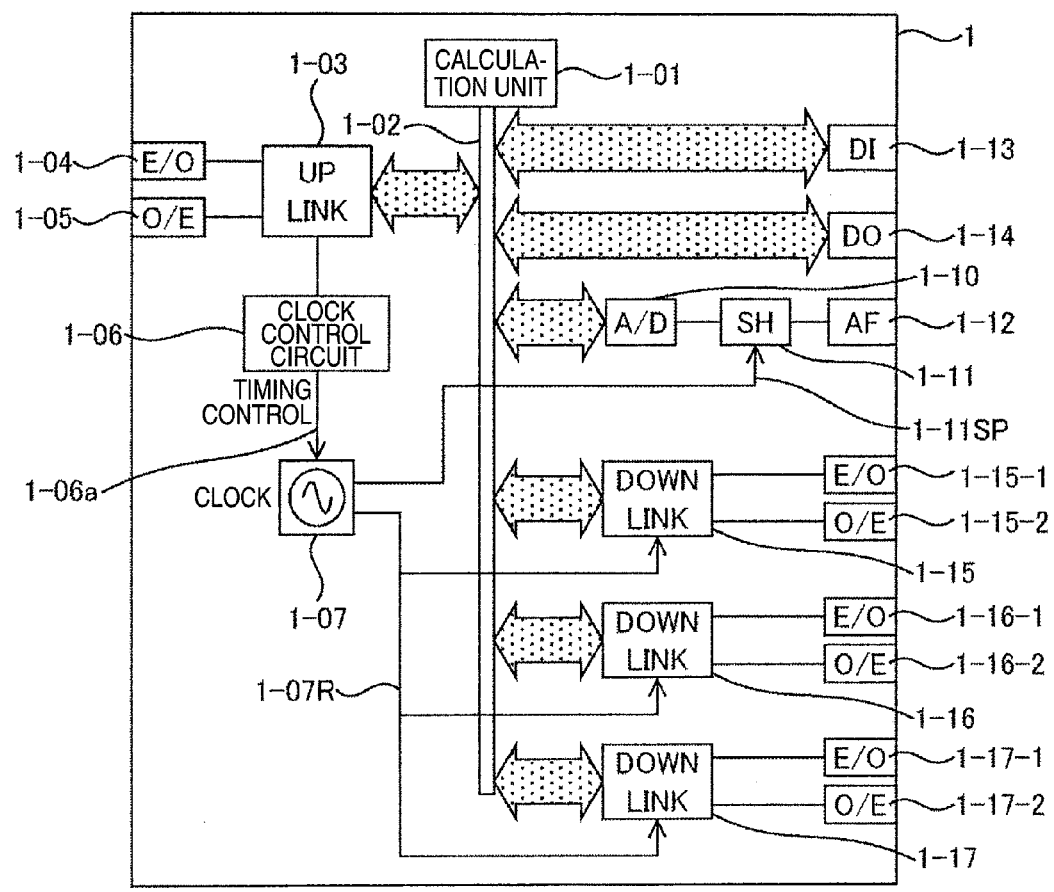
FIG. 1 illustrates a configuration example of a relay terminal device which constitutes a relay system according to the present embodiment.

FIG. 1 illustrates a configuration example of a relay terminal device which constitutes a relay system according to the present embodiment. A terminal station 1 being a terminal device of a protection relay generates a sampling reference signal 1-11SP based on a clock of its own station by using a reference clock unit, shown as "C.L." in the drawing, 1-07. An uplink 1-03 being a transmission unit for an uplink station includes a transmission interface unit 1-04 and a reception interface unit 1-05. In the case where a terminal station connected to a site beyond the transmission interface unit 1-04 and the reception interface unit 1-05 is located, the uplink 1-03 is provided on a clock control circuit, shown as "C.C.C." in the drawing, 1-06 for synchronizing its own station with clock timing of the upper station.

In the case where this communication partner is present, the clock control circuit 1-06 gives to the reference clock unit 1-07 a timing control, shown as "T.C." in the drawing, signal 1-06a for correcting a clock being a signal for synchronizing a clock of its own station with an upper station connected to an uplink. A calculation unit, shown as "C.U." in the drawing, 1-01 is connected to the uplink 1-03 via a system bus 1-02.

In the relay system, an input circuit 1-13 is used for taking ON/OFF information such as external device information. An output circuit 1-14 is used for breaker control or auxiliary relay control during a relay operation. An analog filter unit 1-12 which attenuates a specific frequency domain, a sample-and-hold circuit 1-11 which samples and takes an analog input signal, and an analog-digital converter unit 1-10 which performs analog-digital conversion to a sampled signal each have a circuit for sampling and digitizing current or voltage information of the system side. Sampling timing of this circuit is determined by a sampling reference signal 1-11 SP generated by the reference clock unit 1-07.

In the present embodiment, a downlink 1-15 being a transmission unit for a downlink station is further provided, and a circuit for subordinating it to a clock of the reference clock unit 1-07 of this terminal station is provided in this communication partner destination. In this communication control circuit, as contrasted with the above-described uplink 1-03, there is used a circuit operating as a master clock with respect to the communication partner destination. The downlink 1-15 reads out a synchronization reference signal 1-07R for synchronizing the downlink station side with its own station from the reference clock unit 1-07. The downlink 1-15 further transmits it to the communication partner destination via the transmission interface unit 1-15-1 for the downlink 1-15 and subordinates the communication partner destination to this signal. In addition, the downlink 1-15 receives current information of a power system from the communication partner destination via the reception interface unit 1-15-2 for the downlink 1-15.

In the present embodiment, two or more downlinks are further provided. In the present embodiment, descriptions will be described as a configuration in which three downlinks are totally provided, and there is a meaning in a configuration in which two or more downlinks are provided. Here, a downlink 1-16 is set as a second downlink, and a downlink 1-17 is set as a third downlink. The downlinks 1-16 and 1-17 are also synchronized with the reference clock unit 1-07, and there is no difference from the downlink 1-15 in a point for subordinating the communication partner destination to the synchronization reference signal. A transmission interface unit 1-16-1 for the downlink 1-16 and a transmission interface unit 1-17-1 for the downlink 1-17 each have the same configuration as that of the transmission interface unit 1-15-1. Further, a reception interface unit 1-16-2 for the downlink 1-16 and a reception interface unit 1-17-2 for the downlink 1-17 each have the same configuration as that of the reception interface unit 1-15-2.

The present embodiment has a hybrid configuration capable of having a function of a master station as a clock master, subordinating at least two terminal stations to the master station through a downlink, and being subordinated to one terminal station through an uplink.

Figure 2:
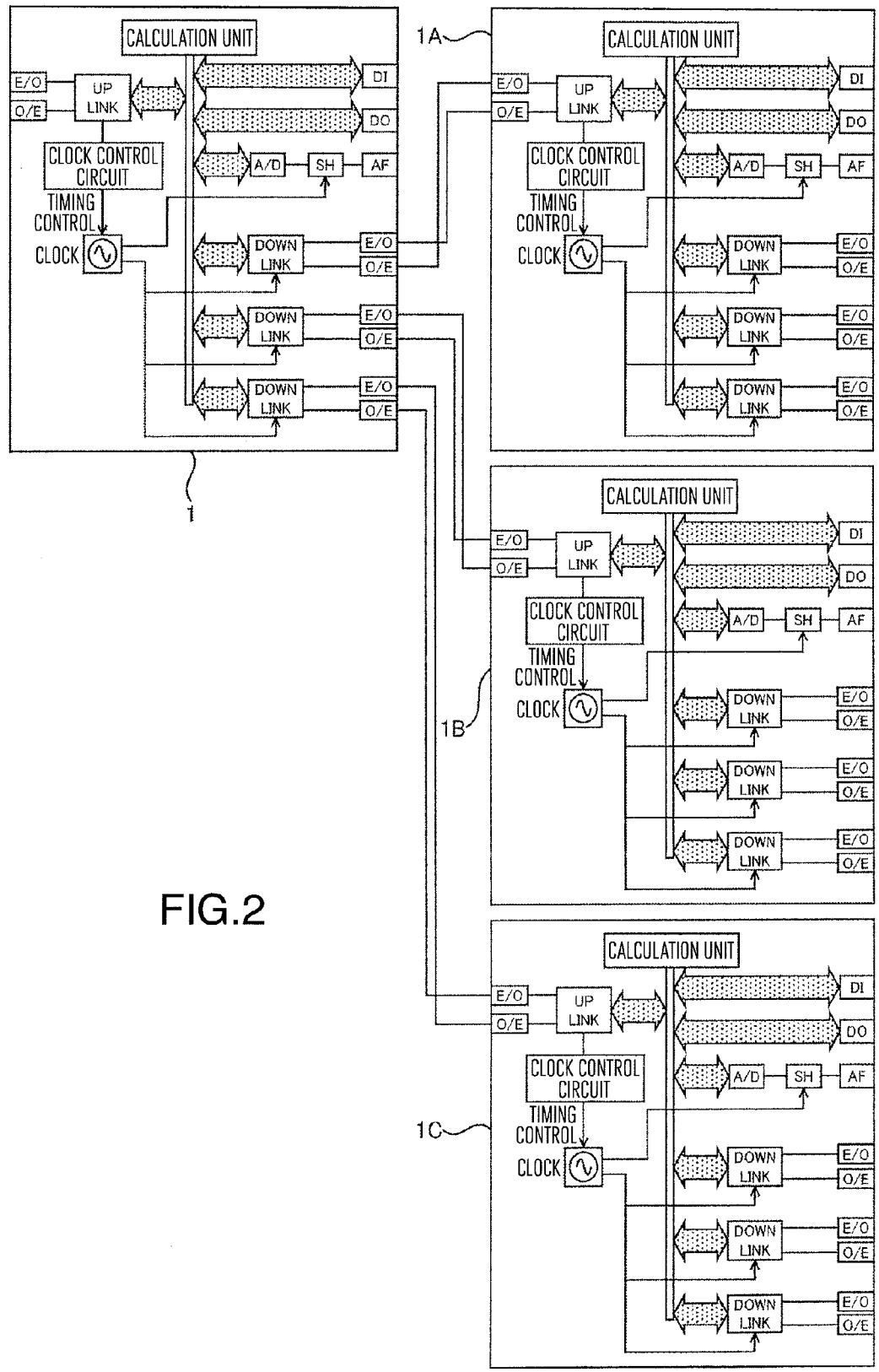
FIG. 2 illustrates a configuration example of a relay system having a lower station of three terminals.

When adopting this configuration, the terminal station 1 is used as a starting point as illustrated in FIG. 2 and terminal stations are connected in a radial pattern from the downlink by using a terminal station having the exact same configuration, thereby expanding the system in a tree form. A terminal station 1A which subordinates its own station to a clock of the terminal station 1 being an upper station connects an uplink side of its own station to the downlink side of the terminal station 1, thereby making the subordinate synchronization. Terminal stations 1B and 1C are the same as the terminal station 1A, and the terminal station 1 functions as a master clock of the four terminal stations.

Figure 3:
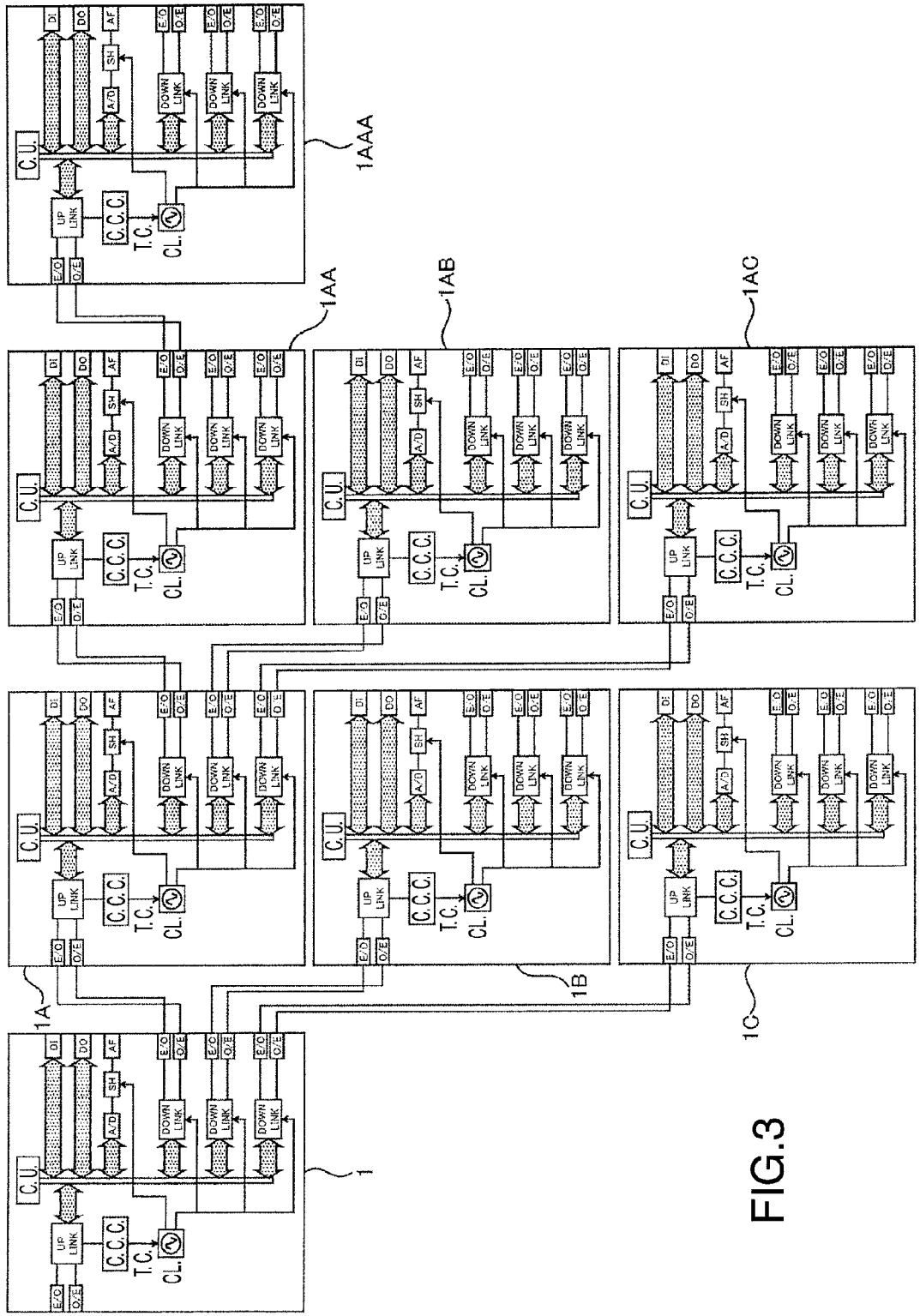
FIG. 3 illustrates a configuration example of eight terminals in which a communication path is configured by using a stage configuration of four stages.

A configuration in which terminal stations are further increased is illustrated in FIG. 3. In this example, when the terminal station 1A is further configured as an intermediate station by using the downlink of the terminal station 1A, three terminal stations such as terminal stations 1AA, 1AB, and 1AC are expanded.

In this example, an example in which a terminal station 1AAA subordinated to the terminal station 1AA is connected thereto is further illustrated. In this case, the terminal station 1AAA is synchronized with a clock of the terminal station 1AA, the terminal stations 1AA, 1AB, and 1AC are synchronized with the terminal station 1A, and the terminal stations 1A, 1B, and 1C are synchronized with the terminal station 1, thereby securing a sampling synchronization of the entire system. When the terminal station 1 is further connected to a downlink of a new terminal station from the uplink side of its own station, it is further synchronized with an upper clock. When a new terminal station is connected to the downlink of the terminal stations 1B, 1C, 1AA, 1AB, 1AC, and 1AAA, a terminal station can be expanded while securing a sampling synchronization of the system.

Figure 4:
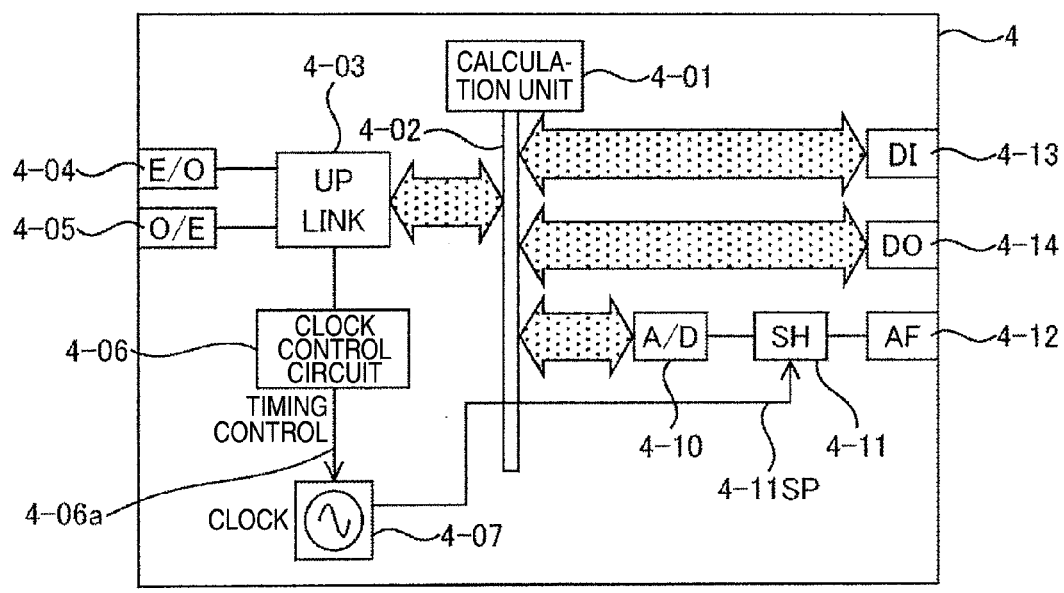
FIG. 4 illustrates a configuration example of a terminal dedicated to a lowermost station.
Figure 5:
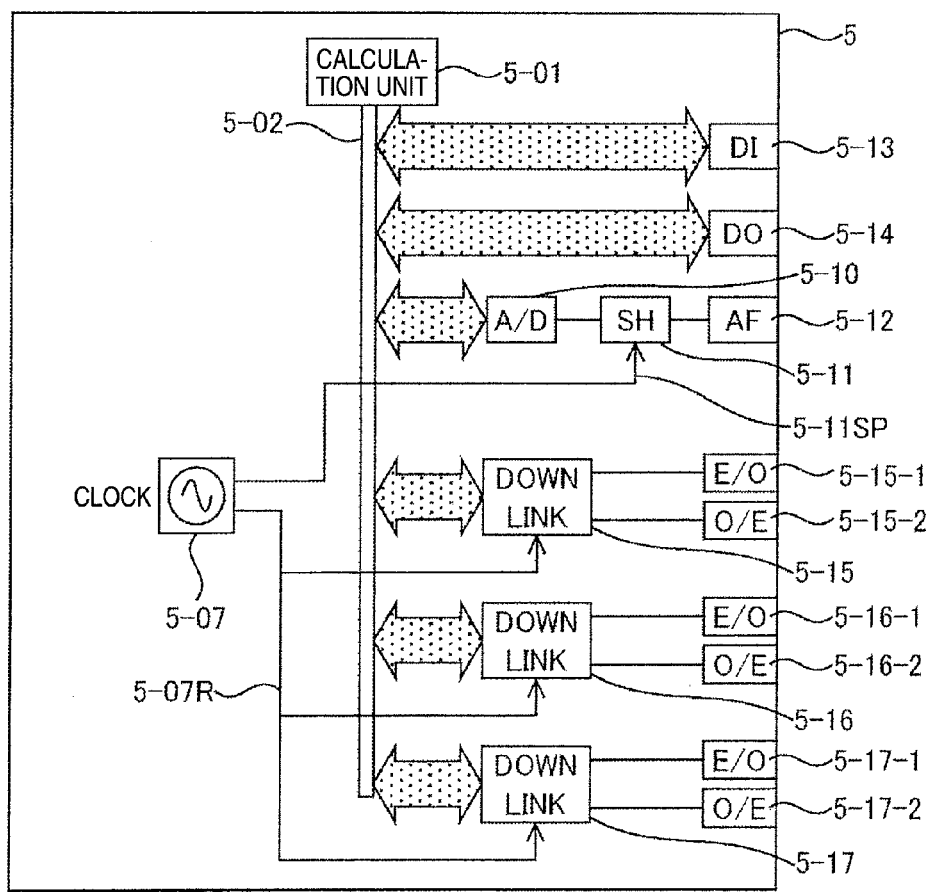
FIG. 5 illustrates a configuration example of a terminal dedicated to an uppermost station.

In this configuration, by using the system configuration illustrated in FIG. 1, an example in which terminal stations of an uppermost station to a tail-end station are constructed is illustrated and a downlink is unnecessary for the tail-end terminal station. On the other hand, an uplink is unnecessary for the uppermost terminal station. Accordingly, there may be used a configuration dedicated to the tail-end terminal station in which a function of the downlink is removed from the terminal station configuration of FIG. 1 as illustrated in FIG. 4, or a configuration dedicated to the uppermost terminal station in which a function of the uplink is conversely removed from the terminal station configuration of FIG. 1 as illustrated in FIG. 5. Further, there may be used a configuration in which an analog input unit is removed from the uppermost terminal station and in which the calculation unit, the input circuit, and the output circuit are left.

Figure 6:
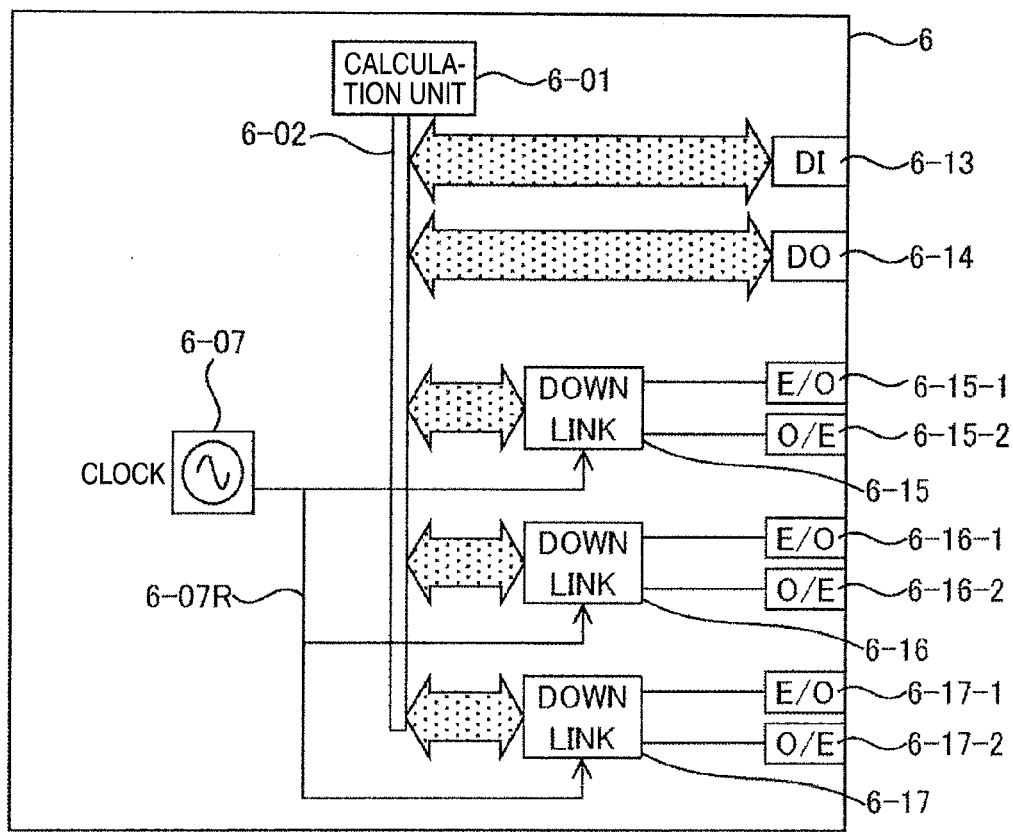
FIG. 6 illustrates a configuration example of a calculation terminal dedicated to an uppermost station.
Figure 7:
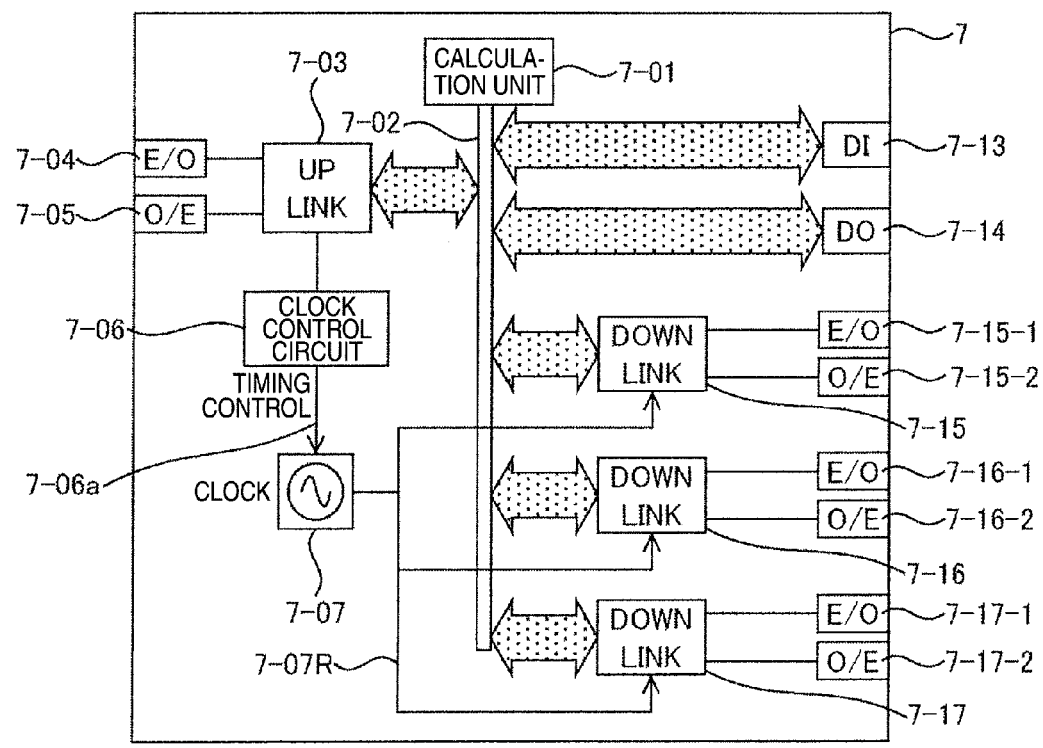
FIG. 7 illustrates a configuration example of a calculation terminal dedicated to an intermediate station.
Figure 8:
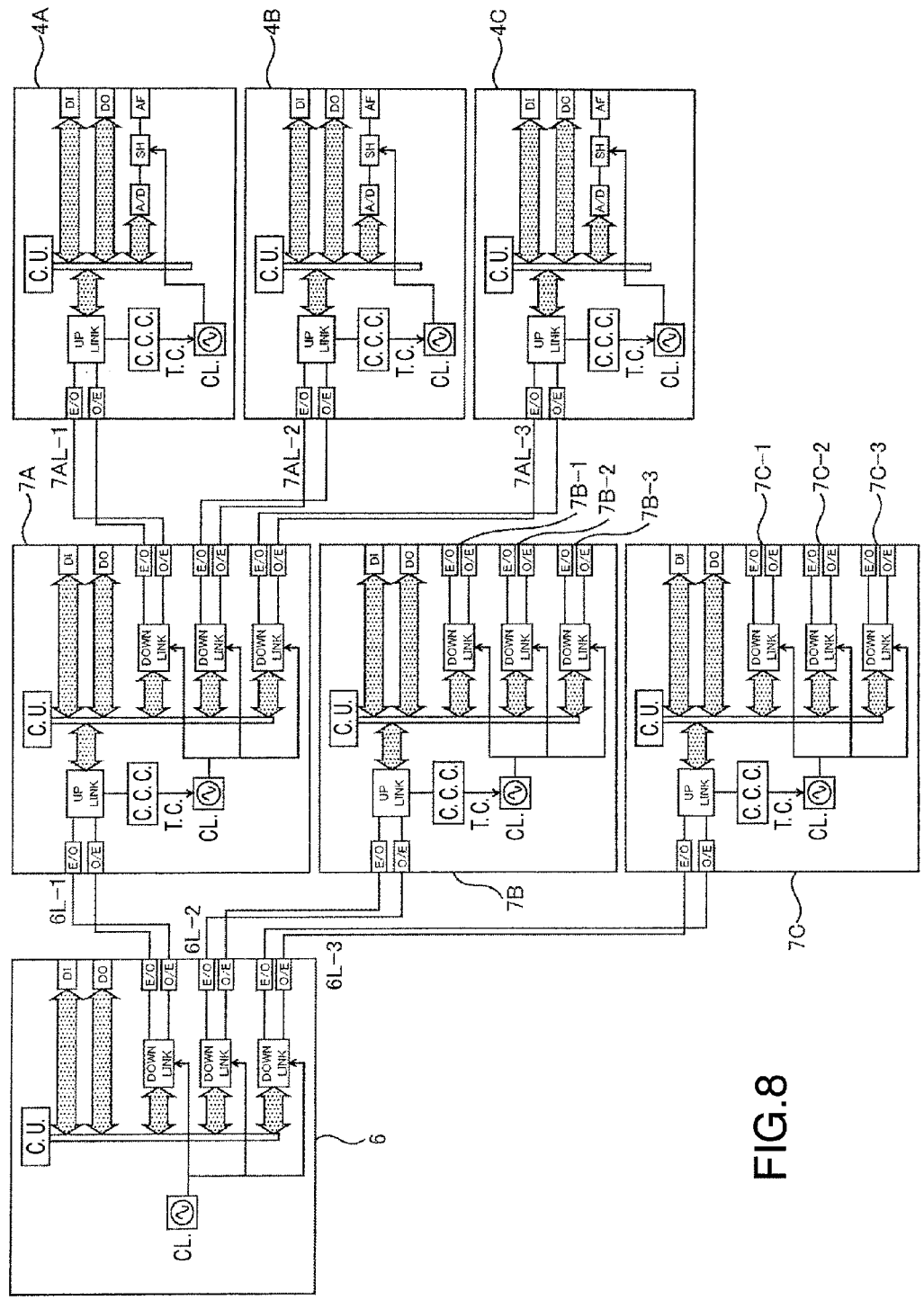
FIG. 8 illustrates an example in which a communication path is configured by using a stage configuration of three stages.

FIG. 7 illustrates a configuration dedicated to the intermediate terminal station, and a configuration in which the uplink and the downlink do not differ from those of FIG. 1 and the analog input unit is eliminated. FIG. 8 illustrates an example in which the terminal station illustrated in FIG. 6 is arranged in the uppermost terminal station 6, terminal stations dedicated to the intermediate terminal station illustrated in FIG. 7 are arranged in the intermediate terminal stations 7A, 7B, and 7C, and a terminal station dedicated to the tail-end apparatus illustrated in FIG. 4 is arranged in the lowermost terminal stations 4A, 4B, and 4C arranged in a lower terminal station of the intermediate terminal station 7A.

From the intermediate terminal stations 7B and 7C, communication ports 7B-1, 7B-2, 7B-3, 7C-1, 7C-2, and 7C-3 further connected to lower terminal stations will be omitted subsequently; further, a terminal station having a configuration of the intermediate terminal stations may be connected or a terminal station dedicated to a tail-end terminal station may be connected thereto.

As can be seen from the above sequence, the terminal station according to the present embodiment has a clock as a reference of the sampling synchronization, and has at least two or more downlinks being a communication port for a lower terminal station of a terminal for subordinating its own station to this clock. The terminal station further has one uplink being a communication port for an upper terminal station for subordinating this clock to a clock of a communication partner destination. In transmission information between respective communication ports, the terminal station transmits information on the time or clock between terminal stations to each other, and performs time setting or clock setting so that the lower station can perform data sampling to the upper station at the same time.

Further, the system having a configuration using this terminal station necessarily connects the downlink to the uplink of a communication partner destination except for the tail-end terminal station as the lowermost terminal station. On the other hand, the uplink is connected to the downlink of the communication partner destination except for the uppermost terminal station. As can be seen from the above sequence, when configuring a system in which terminal stations having treelike topology are connected, a sampling synchronization of the entire system is set so as to be synchronized with the uppermost terminal station of the tree. The system can be configured based on the sampling synchronization data of the entire system and a terminal station can be easily expanded.

Next, a method for implementing a current differential protection relay system for suitable multiple-terminal transmission lines by using terminal stations of the system configuration according to the present embodiment will be further described.

The current differential protection relay system need to cyclically perform a current differential calculation using current data of all terminals at the same time. However, as the number of terminals more increases, the amount of data to be treated more increases by a multiple number of the number of terminals. Therefore, relay calculation processing needs to similarly be increased based on reception processing of communication or received data, and this is a restriction during the increase in the number of the terminals.

In a transmission path configuration using a conventional loop system, for example, as the number of the terminals more increases, the amount of data passing through a transmission path more increases as much as the number of the terminals, and therefore it becomes difficult to add the number of the terminals beyond a limitation of capacity of transmission. Also in the conventional representative terminal judgment type, it is similarly obvious that as the number of the terminals more increases, the reception processing or calculation processing of each terminal more increases. Accordingly, it becomes difficult to add the number of the terminals beyond a limitation of the reception processing or calculation processing.

Figure 9:
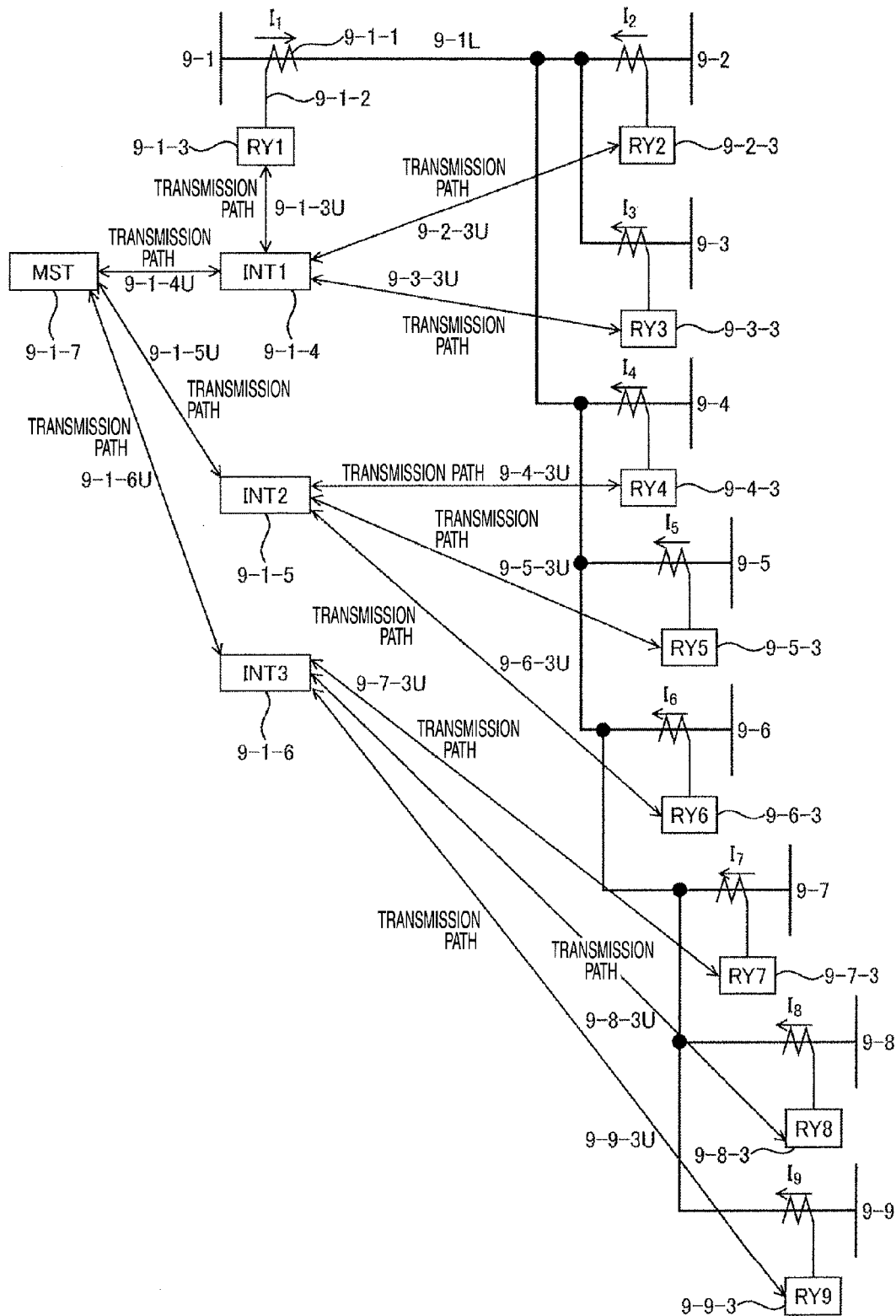
FIG. 9 illustrates a configuration example of a system having a communication path of a stage configuration of three stages corresponding to a protection of a nine-terminal transmission line.

In the current differential protection relay system using the terminal station according to the present embodiment, when the system is constructed, for example, as illustrated in FIG. 9, even if the number of the terminals increases, the system can be constructed without increasing a communication capacity of transmission.

In FIG. 9, there is illustrated an example in which a transmission path among terminals is constructed in treelike topology by using a 9-terminal transmission line and the relay terminal station of the present embodiment. Through the system configuration of the present embodiment, the sampling synchronization of all the terminal stations is performed with respect to a master terminal station 9-1-7 located in the top of the tree. Accordingly, there is secured the sampling synchronization of nine terminal stations 9-1-3, 9-2-3, 9-3-3, 9-4-3, 9-5-3, 9-6-3, 9-7-3, 9-8-3, and 9-9-3 located in the tail end of transmission lines.

Here, when all the data units are simply transferred to the side of the upper terminal stations, the data to be treated on the upper terminal station side increases according to multiplication. For the purpose of transferring data to the side of the upper terminal station, the transmission capacity needs to be increased in the order corresponding to the upper terminal station side.

To solve the above-described problem, the present embodiment has a configuration in which without simply transferring information received from the lower terminal stations to the upper terminal stations, the intermediate terminal station calculates only a suppression amount necessary for a vectorial sum of current and a relay calculation by using current data having secured therein the sampling synchronization received from the lower terminal station side, and transmits only calculation results to the upper terminal station side. The present embodiment further has a configuration in which the upper terminal station further calculates additional processing and a suppression amount with respect to a vector sum of the current received from a plurality of terminal stations on the lower side and further transmits them to an upper terminal station. Finally, the present embodiment has a configuration in which an uppermost terminal station receives the vector sum of current and scalar sum of the suppression amount calculated by each intermediate terminal station, and calculates a size of differential current and a scalar sum from the vector sum of the entire sampling current based on this data, thereby performing the relay calculation.

Through this configuration, even if the number of the terminals increases and a plurality of transmission paths are constructed, the multiple-terminal current differential relay can be implemented without increasing the upper transmission capacity. Through this configuration, there can be implemented a system configuration in which a transmission amount to the upper terminal station side is one amount of current vector sum and one amount of suppression amount with respect to one element of relay as it is and does not depend on the number of the terminals.

Next, a specific relay calculation method will be described with reference to a 9-terminal transmission line. A calculation formula of the current differential relay in the 9-terminal transmission line is as follows. When the current information units of each terminal are set as $I_1$ to $I_9$, a differential current operation element Id is defined as a size of the vector sum of each current (formula 10-001).

As an actual calculation method, an effective value calculation is performed with respect to results of adding all instantaneous values of current sampled at the same time in each tail-end terminal station. Examples of the calculation method of effective values include a method such as an arithmetic mean of a square value and an arithmetic approximation of an absolute value. The suppression amount to bring a rate to a relay characteristic is further defined as a scalar sum of each current (formula 10-002).

A size of each current is calculated by an effective value calculation, thereby implementing this calculation method. Formulae obtained by establishing the formulae 10-001 and 10-002 to nine terminal portions are represented as formulae 10-001a and 10-002a.

$$Id = |\Sigma I_i| \quad \text{(formula 10-001)}$$

$$Id = |I_1 + I_2 + I_3 + I_4 + I_5 + I_6 + I_7 + I_8 + I_9| \quad \text{(formula 10-001a)}$$

$$I_R = \Sigma |I_i| \quad \text{(formula 10-002)}$$

$$I_R = |I_1| + |I_2| + |I_3| + |I_4| + |I_5| + |I_6| + |I_7| + |I_8| + |I_9| \quad \text{(formula 10-002a)}$$

According to a size of the current, the relay characteristic having a rate in a relay sensitivity is given by using minimum operation current K2 and a rate K1 by $$Id \geq K1 \cdot I_R \quad \text{(formula 10-003)}$$

$$Id \geq K2 \quad \text{(formula 10-003A).}$$

Figure 10:
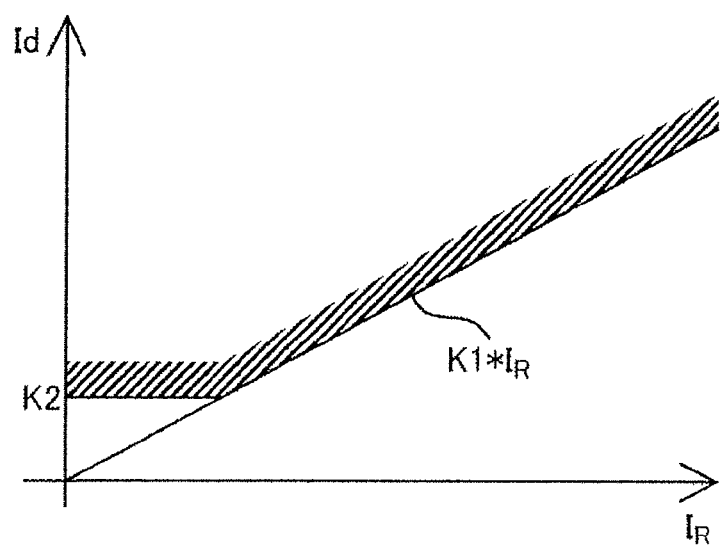
FIG. 10 illustrates an example of a characteristic diagram of a current differential relay.

In FIG. 10, there is illustrated an example of a characteristic diagram of the current differential relay illustrating a relationship between the differential current operation element Id and the suppression amount $I_R$. Ordinarily, a vector sum of instantaneous values of current in a terminal of each transmission line is synthesized and the differential current operation element Id is calculated by a size of its vector. As the suppression amount $I_R$, a value obtained by simply adding sizes of current in a terminal of each transmission line is used. The suppression amount $I_R$ is suppressed so as not to increase the differential current operation element.

Actually, according to a size of current, a relay characteristic having a plurality of rate characteristics of intermediate current range and large current range is further known; however, it fails to harm the present embodiment. Hereinafter, a calculation method of the present embodiment for implementing the current differential relay for multiple-terminal transmission lines will be described.

In the intermediate terminal station, a calculation of vector sum and scalar sum of the suppression amount is supposed to be performed with respect to current information transmitted from the lower terminal station. Further, only the calculation results are supposed to be transmitted to the upper terminal station to compress information.

The current vector sum and scalar sum in the intermediate terminal station are defined as follows.

$$Id_{INT} = I_1 + I_2 + I_3 \quad \text{(formula 10-004)}$$

$$I_{RINT} = |I_1| + |I_2| + |I_3| \quad \text{(formula 10-005)}$$

Instantaneous values of current data acquired at the same time in each tail-end terminal station are added to obtain the formula 10-004. The formula 10-005 represents a scalar sum of the current data acquired in each tail-end terminal station. This calculation method does not differ from the formula 10-002 at all.

Suppose that an intermediate terminal station 1 acquires terminal information of terminals 1 to 3, an intermediate terminal station 2 acquires terminal information of terminals 4 to 6, and an intermediate terminal station 3 acquires terminal information of terminals 7 to 9. When the differential current vector sum and scalar sum calculated in each of the intermediate terminal stations are defined as $Id_{INT1}$, $I_{RINT1}$, $Id_{INT2}$, $I_{RINT2}$, $Id_{INT3}$, and $I_{RINT3}$, respectively, $$Id_{INT1} = I_1 + I_2 + I_3 \quad \text{(formula 10-006),}$$

$$I_{RINT1} = |I_1| + |I_2| + |I_3| \quad \text{(formula 10-007),}$$

$$Id_{INT2} = I_4 + I_5 + I_6 \quad \text{(formula 10-008),}$$

$$I_{RINT2} = |I_4| + |I_5| + |I_6| \quad \text{(formula 10-009),}$$

$$Id_{INT3}=I_7+I_8+I_9 \quad \text{(formula 10-010), and}$$

$$I_{RINT3}=|I_7|+|I_8|+|I_9| \quad \text{(formula 10-0011).}$$

Based on the information from three intermediate terminal stations, the upper terminal station receiving the calculation results calculates the differential current vector sum and scalar sum through the same procedure. When the results are set as $Id_{MST}$ and $I_{RMST}$, $$Id_{MST}=Id_{INT1}+Id_{INT2}+Id_{INT3} \quad \text{(formula 10-012) and}$$

$$I_{RMST}=I_{RINT1}+I_{RINT2}+I_{RINT3} \quad \text{(formula 10-013).}$$

From the above, when the formulae are developed, there are obtained $$Id_{MST}=I_1+I_2+I_3+I_4+I_5+I_6+I_7+I_8+I_9 \quad \text{(formula 10-014) and}$$

$$I_{RMST}=|I_1|+|I_2|+|I_3|+|I_4|+|I_5|+|I_6|+|I_7|+|I_8|+|I_9| \quad \text{(formula 10-015).}$$

When an effective value is further calculated with respect to the result of the formula 10-014, the relay characteristic illustrated in FIG. 10 is matched with a feasible electric charge.

Also in the case where a transmission configuration has three or more stages, the above fact is not changed. The intermediate terminal station always calculates only the sum of current vector and the sum of the scalar amount through a part of current information performed in the lower terminal station, and further transfers calculation results to the upper terminal station. The uppermost terminal station calculates the current vector sum and the scalar sum and then calculates the effective value with respect to the calculation results of the current vector sum, thereby implementing the multiple-terminal current differential relay calculation.

When the results of this relay calculation is traced through a converse communication route, and transferred from the uppermost terminal station to the intermediate terminal station and further from the intermediate terminal station to the tail-end terminal station, thereby notifying the entire system of the calculation results of the current differential relay. In the same manner as in the current differential relay system of the existing representative terminal judgment type, the tail-end terminal station performs tripping control of a breaker according to the calculation results of the current differential relay.

As described above, the intermediate terminal station does not increase a transmission capacity of the upper terminal station side by calculating a current vector sum and a scalar sum. The uppermost terminal station can calculate a current differential relay and implement a multiple-terminal current differential relay. Further, the transmission amount of the upper terminal station side is one amount of the current vector sum and one amount of the suppression amount. Even if the number of terminals increases and the number of stages of a transmission path increases, this is not changed. The present embodiment has a configuration in which a multiple-terminal current differential relay system capable of flexible expansion can be implemented against the increase of the number of terminals.

In the present embodiment, there is solved a problem in multiple terminals of a current differential relay of transmission lines. Further, the present embodiment provides a current differential relay system capable of having multiple terminals in which even if the number of terminals increases, a communication amount for transmission is not increased, even if the number of terminals increases, special hardware need not be developed, and a processing burden for software is not increased.

Second Embodiment

Figure 11:
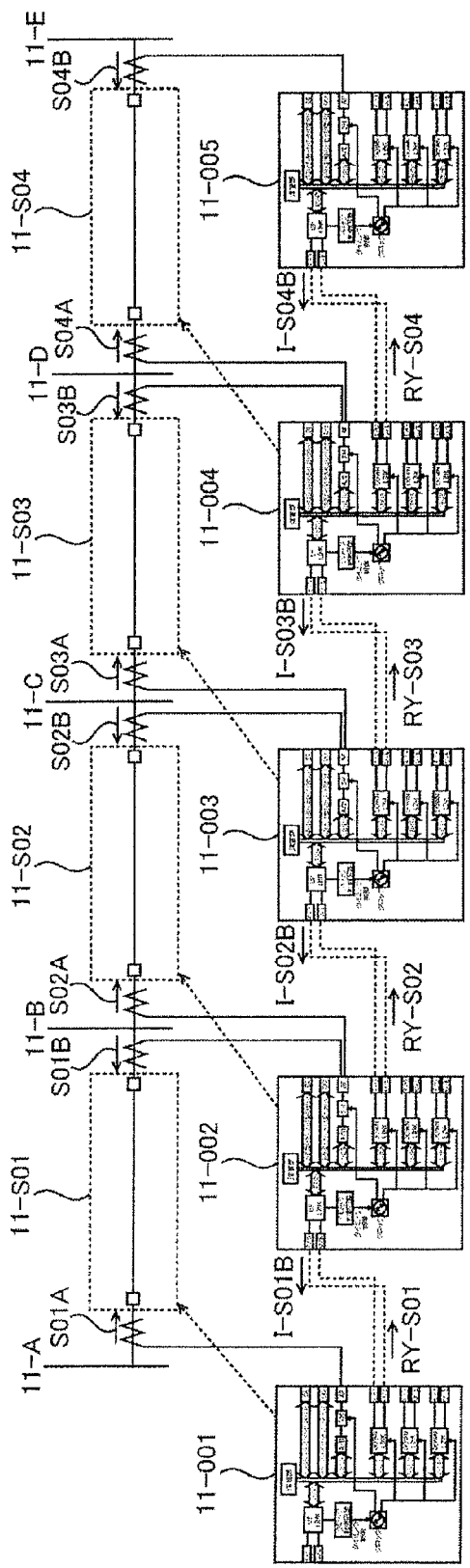
FIG. 11 illustrates an example of a section protection relay according to an application of the present embodiment.

In the present embodiment, eve if a terminal station is communication-connected to multiple stages, sampling synchronization of all terminals is secured. An example in which a section protection system applicable to a multiple-section transmission line is constructed as its application is illustrated in FIG. 11.

Section electric power stations 11-A, 11-B, 11-C, 11-D, and 11-E constituting a transmission network are electric power stations of switchyards building a transmission network, and may be transformer stations having switching equipment. In the present embodiment, the electric power stations 11-A to 11-E are constituted through one transmission line. Here, 11-S01 is set as a transmission line section 1, 11-S02 is set as a transmission line section 2, 11-S03 is set as a transmission line section 3, and 11-S04 is set as a transmission line section 4. Current information units S01A and S01B are those of both ends of the section 1, and taken from a sensor or CT. In the same manner, current information units S02A and S02B are those of both ends of the section 2, current information units S03A and S03B are those of both ends of the section 3, and current information units S04A and S04B are those of both ends of the section 4.

In electric power stations, terminal stations according to the present embodiment are arranged, respectively. Suppose that the terminal station 11-001 is arranged in the electric power station 11-A, the terminal station 11-002 is arranged in the electric power station 11-B, the terminal station 11-003 is arranged in the electric power station 11-C, the terminal station 11-004 is arranged in the electric power station 11-D, and the terminal station 11-005 is arranged in the electric power station 11-E. Suppose further that current information units of both ends of the transmission line are taken from a sensor or CT provided on each electric power station.

In the present embodiment, a configuration in which the terminal station 11-001 is communication-connected as a top of a tree will be described. The terminal station 11-001 is first connected sequentially, and a tail-end station is the terminal station 11-005 in the present embodiment. Through the transmission configuration, a sampling synchronization in which the terminal station 11-001 is implemented as a reference clock is secured.

Suppose in the present embodiment that a current differential relay function of each power transmission section is implemented on the side in which a clock having a high priority is present among terminal stations installed in both ends of a transmission line. In the present embodiment, the current differential relay function of the transmission line section 11-S01 is implemented on the terminal station 11-001. In the same manner, the current differential relay function of the transmission line section 11-S02 is implemented on the terminal station 11-002, the current differential relay function of the transmission line section 11-S03 is implemented on the terminal station 11-003, and the current differential relay function of the transmission line section 11-S04 is implemented on the terminal station 11-004.

Through this configuration, the current information to be transmitted to the upper terminal station through the uplink from each terminal station may be only information for one terminal station portion. For example, the terminal station 11-005 takes the current information S04B and transmits it as the current information I-S04B to the terminal station 11-004 through the uplink. The terminal station 11-004 can perform a current differential relay calculation by using the current information S04A sampled in its own terminal station and the received current information I-S04B. The terminal station 11-004 transmits a relay calculation result RY-S04 to the terminal station 11-005 through the downlink, thereby performing tripping control at both ends during the relay operation.

From the above, the current differential relay system of the section 4 can be constructed. By using the same procedure, the current differential relay system can be constructed also in the other sections and, for example, the terminal station 11-004 transmits the current information I-S03B to the terminal station 11-003. The terminal station 11-003 performs the current differential relay calculation by using the current information S03A sampled in its own terminal station and the received current information I-S03B. When the terminal station 11-003 transmits the relay calculation result RY-S03 to the terminal station 11-004, the current differential relay system of the section 3 can be constructed. Much the same is true on the other sections.

Conventionally, in the case where a current differential relay system is applied to a transmission line having a plurality of sections, a current differential relay device independent from the other sections needs to be installed at both ends of transmission lines in each section. According to the terminal station of the present embodiment, a relay terminal to be installed may be one set in each electric power station, and an inexpensive current differential relay system can be constructed.

The present embodiment further has a configuration in which in the case where any terminal station is not connected to the uplink side, it functions as a reference clock. Also in case communication is disrupted and a failure of a terminal station occurs, a function as a current differential relay is kept between trouble-free terminal stations. Accordingly, the present embodiment provides a relay system in which all functions fail to receive effects and which has high reliability.

In the present embodiment, a simple transmission line of one line with two terminals is illustrated. The present embodiment expands terminals in a tree form, and through the process, can easily correspond to a transmission line having a plurality of lines or a configuration of multiple terminals.

Third Embodiment

As described also in the present embodiment, in principle, a protection relay device for a transmission line current differential needs current information on a partner terminal station in which sampling synchronization is secured and has a communication function. However, an optical interface for communication composed of laser diodes and photodiodes has a limitation to a transmission distance without a relay device because of the attenuation of optical signals due to optical fibers.

Therefore, conventionally, a signal is repeated through a special communication device, thus implementing a long distance correspondence. Communication devices are constructed by signal multiplexing devices and developed as a device for telephone or data transmission. However, through the progress of IP technology, the communication devices are required to be suitable for, for example, a PDH network to a high-speed packet communication, than a conventional cyclic communication network. For this purpose, there includes a big problem in future a combination of communication apparatus composed of a protection relay system which needs a sampling synchronization performance of microsecond order and a packet communication network in which a delay time relies on traffic and a communication time is probabilistically changed.

In the present embodiment, there will be described a system in which when using the terminal station of the present embodiment, a sampling synchronization is easily secured even if a communication path is configured by a terminal station in multiple stages, and when a relay is performed by the same terminal station, a communication distance can be easily extended.

Figure 12:
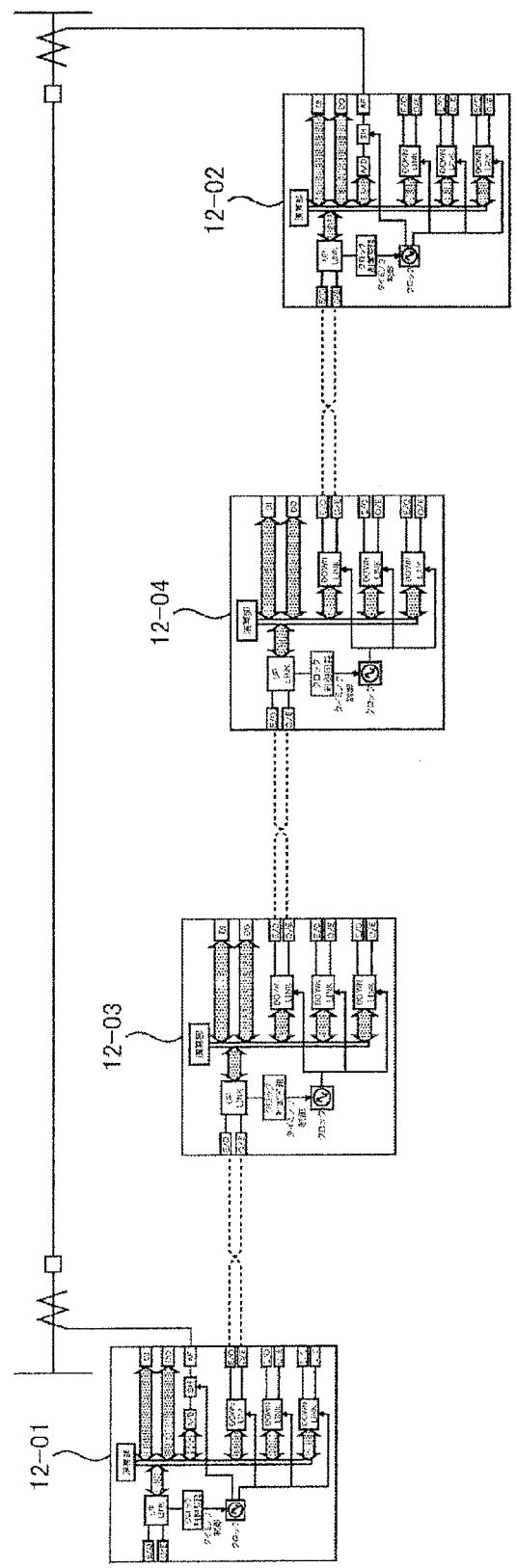
FIG. 12 illustrates an example of a protection relay corresponding to a long-distance line according to an application of the present embodiment.

This configuration is illustrated in FIG. 12. Terminal stations 12-01 and 12-02 are the terminal stations for relay according to the present embodiment illustrated in FIG. 4. Further, terminal stations 12-03 and 12-04 are the terminal stations according to the present embodiment illustrated in FIG. 7. In this configuration, the terminal station 12-01 functions as a reference clock of the entire system. According to this clock, the terminal stations 12-03, 12-04, and 12-02 establish the sampling synchronization.

In the present embodiment, since the terminal stations 12-03 and 12-04 each function as a simple relay device, the terminal station 12-02 receives from the downlink side system information on the sampled voltage or current from the system side and sequentially transmits it to the uplink side. Finally, the information sampled by the terminal station 12-02 is transferred to the terminal station 12-01, thus performing a relay calculation. The relay calculation results are sequentially transmitted from the downlink of the terminal station 12-01 to the lower terminal station side. Further, they are finally transferred to the terminal station 12-02, thus performing the control as the protection relay. As described above, the present embodiment has a terminal configuration in which a relay for transmission can be easily implemented while securing the sampling synchronization.

As described above, the present embodiment can standardize terminal stations configuring a multiple-terminal current differential relay system. Through the process, a terminal station having the same system configuration is combined in multiple stages even if the number of terminals increases, thereby expanding the number of terminals of the current differential relay.

Even if a terminal station having a hardware configuration matched with a shape of transmission lines is not developed, a current differential relay system of the representative terminal judgment type can be easily constructed by using the terminal station of the present embodiment.

A system using the terminal stations according to the present embodiment has a configuration in which by using current data in which the sampling synchronization received from the lower terminal station side is secured, only a vector sum of current and a suppression amount necessary for a final relay calculation are calculated and only the calculation results are transmitted to the upper terminal station side. The system further has a configuration in which in the upper terminal station side, additional processing and the suppression amount are further calculated to the vector sum of current received from a plurality of lower terminal station side, and calculation results are further transmitted to the upper terminal station. Through the above-described configuration, even in the case where the number of terminals increases and a system configuration has multiple stages, a current differential relay having multiple terminals can be implemented without increasing a transmission capacity of the upper terminal station side.

In the above-described embodiments, a current differential relay which communicates current information is described, and the terminal station according to the present embodiment can collect sampling synchronization data of wide area. The terminal stations can be applied to applications of protection relay system, stabilizing device, and fault point location device necessary for sampling information on voltage or current of power system for different points. Further, the terminal station can be applied not only to the sampling information on current or voltage but also to a wide-area protection system in which device information and calculation results of relays are collected.

REFERENCE SIGNS LIST 1, 1A~1C, 1AA, 1AB, 1AC, 1AAA, 9-1-3~9-9-3, 11-001~11-005, 12-001~12-004 Terminal station
1-01, 4-01, 5-01, 6-01, 7-01 Calculation unit
1-02, 4-02, 5-02, 6-02, 7-02 System bus
1-03, 4-03, 7-03 Uplink
1-04, 1-15-1, 1-16-1, 1-17-1, 4-04, 5-15-1, 5-16-1, 5-17-1, 6-15-1, 6-16-1, 6-17-1, 7-04, 7-15-1, 7-16-1, 7-17-1 Transmission interface unit
1-05, 1-15-2, 1-16-2, 1-17-2, 4-05, 5-15-2, 5-16-2, 5-17-2, 6-15-2, 6-16-2, 6-17-2, 7-05, 7-15-2, 7-16-2, 7-17-2 Reception interface unit
1-06, 4-06, 7-06 Clock control circuit
1-06a, 4-06a, 7-06a Timing control signal
1-07, 4-07, 7-07 Reference clock unit
1-07R, 5-07R, 6-07R, 7-07R Synchronization reference signal
1-1, 4-11, 5-11 Sample-and-hold circuit
1-10 Analog-digital converter unit
1-11SP, 4-11SP, 5-11SP Sampling reference signal
1-12, 4-12, 5-12 Analog filter unit
1-13, 4-13, 5-13, 6-13, 7-13 Input circuit
1-14, 4-14, 5-14, 6-14, 7-14 Output circuit
1-15, 1-16, 1-17, 5-15, 5-16, 5-17, 6-15, 6-16, 6-17, 7-15, 7-16, 7-17 Downlink
4-10, 5-10 Analog-digital converter
4A~4C Lowermost terminal station
5-07, 6-07 Reference clock unit as a master of all terminal stations
6 Uppermost terminal station
6L-1 Communication route connected to a lower intermediate terminal station 7A from the uppermost terminal station 6
6L-2 Communication route connected to an intermediate terminal station 7B from the uppermost terminal station 6
6L-3 Communication route connected to an intermediate terminal station 7C from the uppermost terminal station 6
7A, 7B, 7C, 9-1-4~9-1-6 Intermediate terminal station
7AL-1 Communication route connected to the lowermost terminal station 4A from the intermediate terminal station 7A
7AL-2 Communication route connected to the lowermost terminal station 4B from the intermediate terminal station 7A
7AL-3 Communication route connected to the lowermost terminal station 4C from the intermediate terminal station 7A
7B-1, 7B-2, 7B-3 Communication port further connected to a lower terminal station from the intermediate terminal station 7B
7C-1, 7C-2, 7C-3 Communication port further connected to a lower terminal station from the intermediate terminal station 7C
9-1, 9-2, 9-3, 9-4, 9-5, 9-6, 9-7, 9-8, 9-9 Transforming station in a tail end of transmission line 9-1L
9-1L Transmission line of 9 terminals
9-1-1 CT for measuring current in a tail end of transmission line of the terminal 9-1
9-1-2 CT secondary cable connected to a relay 9-1-3 from the 9-1-1 CT
9-1-7 Master terminal station
9-1-3U, 9-2-3U, 9-3-3U, 9-4-3U, 9-5-3U, 9-6-3U, 9-7-3U, 9-8-3U, 9-9-3U Transmission path for connecting a lower terminal station and an intermediate terminal station
9-1-4U, 9-1-5U, 9-1-6U Communication path for connecting an intermediate terminal station and the uppermost intermediate terminal station 9-1-7
11-A, 11-B, 11-C, 11-D, 11-E Electric power station
11-S01 Transmission line section 1
11-S02 Transmission line section 2
11-S03 Transmission line section 3
11-S04 Transmission line section 4
Id Differential current operation element
$I_R$ Suppression amount
S01A~S04A, S01B~S04B, I-S01B~I-S04B Current information
RY-S01~RY-S04 Relay calculation result

The invention claimed is:

1. A digital protection control system comprising, as terminal stations:
a reference terminal station configured to take system current information and function as a reference of sampling time;
a tail-end terminal station configured to take system current information from a power system; and
an intermediate terminal station configured to be connected through a transmission path between the reference station and the tail-end station,
wherein:
the digital protection control system transmits and receives system current information between a plurality of the reference, tail-end, and intermediate terminal stations and performs protection control of the power system;
the intermediate terminal station includes an upper transmission unit connected at a reference terminal station side thereof to the transmission path and a plurality of lower transmission units connected to the transmission path at a tail-end terminal station side thereof; and
the digital protection system subordinates time of the intermediate terminal station to time of the reference terminal station, which is connected to the upper transmission unit, and subordinates time of at least one of the lower transmission units, which is connected to the tail-end terminal station, to time of the intermediate terminal station.

2. The digital protection control system according to claim 1, wherein the intermediate terminal station calculates a scalar sum and vector sum of the system current information transmitted from the at least one of the lower transmission units, and transmits a calculation result to the upper transmission unit.

3. The digital protection control system according to claim 2, wherein the intermediate terminal station takes system current information from the power system based on time of the intermediate terminal station, calculates the vector sum and scalar sum, and transmits a calculation result to the upper transmission unit.

4. The digital protection control system according to claim 2, wherein the reference terminal station or the intermediate terminal station performs a protection control calculation of the power system based on the vector sum and scalar sum.

5. The digital protection control system according to claim 1, wherein:
the intermediate terminal station performs a relay calculation for determining abnormality of the power system by using system current information received from the at least one of the lower transmission units, and transmits a calculation result to the at least one of the lower transmission units; and the intermediate terminal station selects and transmits system current information necessary for a relay calculation to the reference terminal station.

6. A digital protection control system comprising:

a plurality of terminal stations configured to be connected through a transmission path, wherein:

the digital protection control system transmits and receives system current information of a power system between the plurality of terminal stations, and performs protection control of the power system;

the plurality of terminal stations include an intermediate terminal station that:

includes an uplink transmission unit to which at least one of the terminal stations is connected to provide a reference time of the at least one terminal station, and a plurality of downlink transmission units to which at least one other terminal station subordinating time thereof to the reference time is connected;

synchronizes time of the intermediate terminal station based on a first synchronizing signal transmitted from the at least one of the terminal stations connected to the uplink transmission unit; and transmits a second synchronizing signal for synchronizing time of the at least one other terminal station connected to the downlink transmission units.

7. A digital protection control system comprising:

a reference station configured to take system current and have a clock functioning as a reference of sampling time;

a plurality of intermediate stations configured to be connected to the reference station through a transmission path and synchronize a clock of the intermediate stations with the clock of the reference station; and a plurality of tail-end stations configured to be connected to one intermediate station among the plurality of intermediate stations through a transmission path, and synchronize a clock of the tail-end station with the clock of the intermediate stations, and take system current information from a power system based on the synchronized clock of the tail-end station.

8. The digital protection control system according to claim 7, wherein:

the plurality of tail-end stations transmit the system current information taken from the power system to the intermediate station connected to the tail-end station; and the intermediate station calculates differential current and suppression amount of a plurality of system current information units transmitted from the plurality of tail-end stations, and transmits a calculation result to the reference station.

9. The digital protection control system according to claim 8, wherein the intermediate station takes system current information from the power system based on a clock of the intermediate station, and calculates differential current and suppression amount matched with the taken system current information.

10. A digital protection control apparatus comprising:

an uplink transmission unit configured to transmit system current information to a reference terminal as a reference of time, and receive a clock reference signal from the reference terminal;

a clock unit configured to synchronize time of the clock unit with the clock reference signal input through the uplink transmission unit, and output a clock subordinate signal indicating time of the clock unit; and a plurality of downlink transmission units each configured to transmit, in the case where a terminal is connected, the clock subordinate signal to the terminal and receive system current information from the terminal.

11. The digital protection control apparatus according to claim 10, further comprising, in the case where a terminal is connected to each of at least two downlink transmission units among the plurality of downlink transmission units, a calculation unit configured to calculate a vector sum and scalar sum of a plurality of system current information units received through at least the two downlink transmission units, wherein the vector sum and the scalar sum are transmitted to the reference terminal via the uplink transmission unit.

12. The digital protection control apparatus according to claim 11, further comprising a sampling unit configured to take system current information from a power system based on a sampling reference signal output from the clock unit, wherein the calculation unit calculates a vector sum and scalar sum of a plurality of system current information units received via the downlink transmission unit and the system current information taken by the sampling unit, and transmits the vector sum and the scalar sum to the reference terminal via the uplink transmission unit.

* * * * *